(12) United States Patent
Ma et al.

(10) Patent No.: US 8,925,021 B2
(45) Date of Patent: Dec. 30, 2014

(54) METHOD AND SYSTEM FOR TRICK PLAY IN OVER-THE-TOP VIDEO DELIVERY

(75) Inventors: Kevin J. Ma, Nashua, NH (US); Radim Bartos, Durham, NH (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 13/540,788

(22) Filed: Jul. 3, 2012

(65) Prior Publication Data

US 2013/0019273 A1 Jan. 17, 2013

Related U.S. Application Data

(60) Provisional application No. 61/506,431, filed on Jul. 11, 2011.

(51) Int. Cl.
| | |
|---|---|
| *H04N 7/173* | (2011.01) |
| *H04L 29/06* | (2006.01) |
| *H04N 21/2343* | (2011.01) |
| *H04N 21/24* | (2011.01) |
| *H04N 21/6587* | (2011.01) |
| *H04L 29/08* | (2006.01) |
| *H04N 21/845* | (2011.01) |

(52) U.S. Cl.
CPC ........ *H04N 21/2402* (2013.01); *H04L 65/4092* (2013.01); *H04N 21/234363* (2013.01); *H04N 21/6587* (2013.01); *H04L 67/02* (2013.01); *H04N 21/8456* (2013.01); *H04N 21/234309* (2013.01); *H04N 21/234381* (2013.01)
USPC .................. 725/90; 725/86; 725/87; 725/88; 725/89

(58) Field of Classification Search
CPC .................. H04N 21/234381; H04N 21/2387; H04N 21/2402; H04N 21/6587
USPC ....................................... 725/86–90
See application file for complete search history.

(56) References Cited

U.S. PATENT DOCUMENTS

| | | | | |
|---|---|---|---|---|
| 7,155,109 | B2 * | 12/2006 | Gates et al. | 386/344 |
| 7,231,132 | B1 * | 6/2007 | Davenport | 386/343 |
| 7,853,980 | B2 | 12/2010 | Pedlow, Jr. et al. | |
| 7,962,942 | B1 | 6/2011 | Craner | |
| 2005/0022246 | A1 * | 1/2005 | Kung | 725/90 |
| 2007/0133942 | A1 * | 6/2007 | Moors et al. | 386/68 |
| 2007/0140647 | A1 * | 6/2007 | Kusunoki et al. | 386/68 |
| 2008/0148327 | A1 * | 6/2008 | Xu | 725/105 |
| 2008/0263605 | A1 * | 10/2008 | Mine et al. | 725/87 |
| 2008/0304810 | A1 * | 12/2008 | Rijckaert et al. | 386/68 |

(Continued)

OTHER PUBLICATIONS

Pantos, R., Iphone HTTP Live Streaming: http://tools.ietf.org/html/draft-pantos-http-live-streaming-07, Apple Inc., Mar. 31, 2011, 24 pages.

(Continued)

*Primary Examiner* — Gigi L Dubasky

(57) ABSTRACT

A method for trick play (fast forward, rewind, etc.) in video streams using adaptive bitrate HTTP delivery protocols includes playing only portions of a video at a current bitrate to achieve the initial trick play functionality. A new trick play bitrate is selected based on a trick play playout rate, the trick play bitrate for the duration of the trick play is retrieved, and operation is switched back to a previous bitrate when normal playback resumes. A system is also specified for implementing a client and server infrastructure in accordance with the method.

19 Claims, 4 Drawing Sheets

(56) References Cited

U.S. PATENT DOCUMENTS

| | | | |
|---|---|---|---|
| 2009/0161765 A1* | 6/2009 | Joyce et al. | 375/240.23 |
| 2011/0010748 A1* | 1/2011 | Asami | 725/116 |
| 2011/0116772 A1* | 5/2011 | Kwon et al. | 386/343 |
| 2012/0042090 A1 | 2/2012 | Chen et al. | |
| 2012/0210216 A1* | 8/2012 | Hurst | 715/716 |

OTHER PUBLICATIONS

Using Silverlight™ DRM, Powered by PlayReady®, with Windows Media® DRM Content, Silverlight smooth streaming: http://download.microsoft.com/download/7/6/D/76D540F7-A008-427C-8AFC-BE9E0C0D8435/Using_Silverlight_with_Windows_Media_DRM-Whitepaper_FINAL.doc; Microsoft Corporation, Nov. 2008, 11 pages.

* cited by examiner

METHOD AND SYSTEM FOR TRICK PLAY IN OVER-THE-TOP VIDEO DELIVERY

BACKGROUND

This invention relates in general to over-the-top (OTT) media delivery and more specifically to providing certain playback functionality referred to as "trick play" (fast forward, rewind, etc.) in HTTP adaptive video streams.

As content delivery models move away from streaming distribution over private networks to Web-based delivery of files over the public Internet, referred to as over-the-top (OTT) delivery, traditional streaming video paradigms must be modified to support new delivery protocols, e.g., HTTP Live Streaming. In legacy RTP-based streaming, content playback is controlled at a specialized video streaming server. Video content is delivered in a frame-based manner, and the client renders all frames as they are delivered from the video streaming server. Trick play is typically implemented by the video streaming server removing and reordering frames from the original video stream (possibly using a pre-generated trick play file) and presenting it as a normal stream to the client. In the case of HTTP adaptive bitrate protocols, the client typically requests content, in segments, from a commodity HTTP server. There is no video streaming server to manipulate the content stream. Segments are typically prefetched and played out in order. In many cases, particularly when delivering to mobile devices, bandwidth is limited and download of duplicate content for the purposes of trick play is undesirable.

SUMMARY

Methods and apparatus are disclosed for supporting trick play functionality in an adaptive bitrate video stream. Support is provided for OTT content delivery to client devices using segment-based HTTP delivery protocols (e.g., HTTP Live Streaming, Silverlight Smooth Streaming, MPEG/3GP Dynamic Adaptive Streaming over HTTP (DASH), etc.). Segment-based delivery protocols are used to allow rate adaptation in environments which have fluctuations in bandwidth. Segment boundaries provide natural demarcation points for switching bitrates. Another example of a protocol and file format suitable for segment-based rate adaptation is described in PCT Application No. PCT/US2010/027893 filed Mar. 19, 2010, and entitled, Method for Scalable Live Streaming Delivery for Mobile Audiences. Yet another example of a protocol and file format suitable for segment-based rate adaptation is described in PCT Application No. PCT/US2010/028309 filed Mar. 23, 2010, and entitled, Method and System for Efficient Streaming Video Dynamic Rate Adaptation. There are many protocols and methods for generating segmented content, as should be known to those skilled in the art. Any of these segmentation methods are suitable for use in accordance with provisions of the invention. For segment-based formats (e.g., segmented 3GP, fragmented MP4, segmented MPEG-TS, etc.) where content is prepackaged into independently playable segments, segments are typically prefetched into a buffer. Performing trick play using those prefetched segments, without downloading duplicate content, prevents wasting of bandwidth.

Trick play is described in two parts: trick play playout rate and trick play playout direction. In one embodiment, the trick play playout rate is described as a multiple, referred to herein as the trick play multiplier, of the nominal playout rate (e.g., 2× speed, 4× speed, ½ speed, ¼ speed, etc.). In another embodiment, the playout rate is described in terms of frame rate (e.g., 60 fps, 120 fps, 15 fps, etc.), which can be calculated as the nominal frame rate times the trick play multiplier. The trick play direction is either forward or backward. Trick play is implemented by reordering frames and their presentation times such that they are rendered at the requested trick play playout rate and in the requested trick play playout direction. In general, the trick play playout rate is different from the nominal playout rate which also corresponds to the download rate over the network. Thus, some form of compensating action may be used to modify the downloading so that the overall download rate is still within the available network bandwidth. Examples of the compensating action include use of lower-rate encoding for trick play, as well as the use of only initial portions of segments and aborting the downloading of remainder portions.

In one embodiment, the client extracts independently renderable key frames (e.g., MPEG I-frames, JPEG images, etc.) from the segment. The inter-key-frame gaps are referred to herein as a group of pictures (GOP) size (the number of frames between key frames) or GOP duration (the amount of wall clock time between key frames, also calculated as the GOP size divided by the frame rate). In one embodiment, fixed GOP sizes are provided to the client in the response to the playback request. In another embodiment, fixed GOP sizes are denoted in the manifest file describing the content requested. In another embodiment, GOP sizes are determined when separating out the key frames from a segment, referred to herein is "parsing". If fixed sized GOPs are used, the GOP is determined once and stored for future use. If variable sized GOPs are used, a trailing history of key frame locations and durations is maintained. In one embodiment, these key frames are used to implement trick play functionality.

For fast forward, frames are removed to achieve the desired trick play playout rate. In one embodiment, only key frames are used in the rendered output. Key frames are repeated to achieve the desired trick play playout rate, e.g., given a video with a fixed GOP of 60 frames, a 4× trick play playout rate can be achieved by issuing each key frame 15 times. In general, each key frame is replayed (G/R) times, where G is the GOP size and R is the trick play playout rate multiplier. If R is a fractional rate, then slow motion playback ensues. If (G/R) is less than 1, then key frames are skipped as well. For rewind, a similar approach of using repeated key frames may be applied. When only key frames are used, almost the entire segment still needs to be downloaded, in order to parse out the key frames. In one embodiment, if the fixed GOP is known, download of the final portion of a segment after the last key frame in the segment, may be aborted. If the trick play playout rate is higher than the nominal playout rate, the download bandwidth required increases, e.g., a video encoded at a nominal bitrate of 800 kbps requires 800 kbps of download bandwidth, but at a 4× rate, it requires 3200 kbps to download four times as much data. In adaptive bitrate delivery, the current nominal bitrate is selected based on the current estimated available bandwidth. To support higher rate playout, while still adhering to the available bandwidth, a lower bitrate encoding is selected, e.g., if the network will only support 800 kbps download, and a 4× trick play playout rate is desired, trick play adapts to using 200 kbps video during trick play. In general, the content retrieved for trick play should have an encoded bitrate less than (B/R), where B is the estimated bandwidth available and R is the trick play playout rate multiplier.

In another embodiment, fast forward uses bursts of consecutive frames (both key frames and non-key frames). To limit the bandwidth wasted downloading non-key frames when only key frames are used, the initial portions of segments may be used and the latter portion of segments skipped, e.g., given a segment duration of ten seconds, and a trick play playout rate of 5×, downloading and playing just the first two seconds of each segment would achieve a 5× playout rate without a commensurate increase in bandwidth usage. In one embodiment, all segments are of fixed duration. In another embodiment, all segments contain a fixed number of bytes. In one embodiment, all segments begin with a key frame. In another embodiment, segments may begin with non-key frames. In general, the first (D*F/R) frames of each segment are played out, where D is the time duration of each segment, F is the frame rate of the encoded video, and R is the trick play playout rate multiplier. If segments do not begin with a key frame, playback should begin with the first key frame in the segment. The duration D should be reduced by (L/F), where L is the number of leading non-key frames and F is the frame rate of the encoded video. If the segment is not duration-based, i.e., if the segment is byte-based, the duration D should be estimated as (S/E), where S is the size of the segment in bits and E is the encoded bitrate of the content. In one embodiment, segments with short durations D (e.g., less than 10 seconds) may be concatenated to improve rendering continuity.

When playing out only the initial portion of a segment, theoretically all of the downloaded content could be used without discarding any data and therefore no rate adaptation would be required to compensate for discarded data. However, because video is compressed the number of bytes per frame is variable. Though a fixed number of frames (D*F/R) are to be rendered, the exact number of bytes occupied by those frames is typically not known a priori. The exact number of bytes may be determined dynamically, if it is not known a priori. In one embodiment, segment headers contain frame pointer information which may be parsed to determine how many bytes need to be downloaded. The portion of the segment containing the headers may be downloaded and then parsed in parallel with the download of the remainder of the segment. The headers are a very small portion of the segment and parsing the headers is much faster than the download of the remainder of the segment, therefore, the number of bytes required should be known prior to completion of the download of those bytes. Once the desired number of bytes has been downloaded, the rest of the segment is unnecessary and the connection may be aborted to minimize the download of unnecessary data.

In another embodiment, parsing of each individual frame is required to determine when the desired number of frames has been reached. Once the desired number of frames have been downloaded, the rest of the segment is unnecessary and the connection may be aborted to minimize the download of unnecessary data. Detection of the completion of the download of the desired frames may be delayed due to processing latency and additional data beyond the desired frames may be downloaded unnecessarily. The round trip latency required to signal the abort of the connection may also result in additional data beyond the desired frames may be downloaded unnecessarily. In one embodiment, compensation for unnecessary data download may be enacted through rate adaptation. In one embodiment, to compensate for any bandwidth overages caused by the latency of detecting when to abort segment download, a video encoding with an encoded bitrate less than the current estimated available bandwidth is used. In general, an encoded bitrate less than or equal to (B−O/D) may be used, where B is the estimated bandwidth available, O is the overhead of aborting a segment download connection (measured in unnecessary bits downloaded), and D is the fixed time duration of each segment. In one embodiment, when trick play ends, the remainders of partially downloaded segments, which have not yet played out, are downloaded for use in normal playback.

In another embodiment, special trick play segments are used in place of normal playout segments. In one embodiment, the segments contain only key frames. In one embodiment, each key frame is only included once and must be repeated as necessary to achieve the requested trick play playout rate. In one embodiment, the key frames in the trick play segments conform to the same fixed sized GOP as the normal playback segments. In another embodiment, the key frames in the trick play segments may conform to a smaller GOP than the normal playback segments, in order to provide finer granularity in trick play playout rate selection. In another embodiment, the key frames in the trick play segment may conform to a larger GOP than the normal playback segments, in order to further reduce the bandwidth required for trick play segments. For a given GOP, playing each key frame once would give a fixed trick play playout rate multiplier of G, where G is the GOP size. In one embodiment, each key frame is repeated (G/R) times, where G is the GOP size and R is the trick play playout rate multiplier. A smaller GOP reduces the number of times a key frame needs to be repeated thus providing a finer granularity of detail in the rendered trick play playback. A larger GOP requires that key frames be repeated more thus providing a coarser granularity of detain in the rendered trick play playback.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Figure 1:
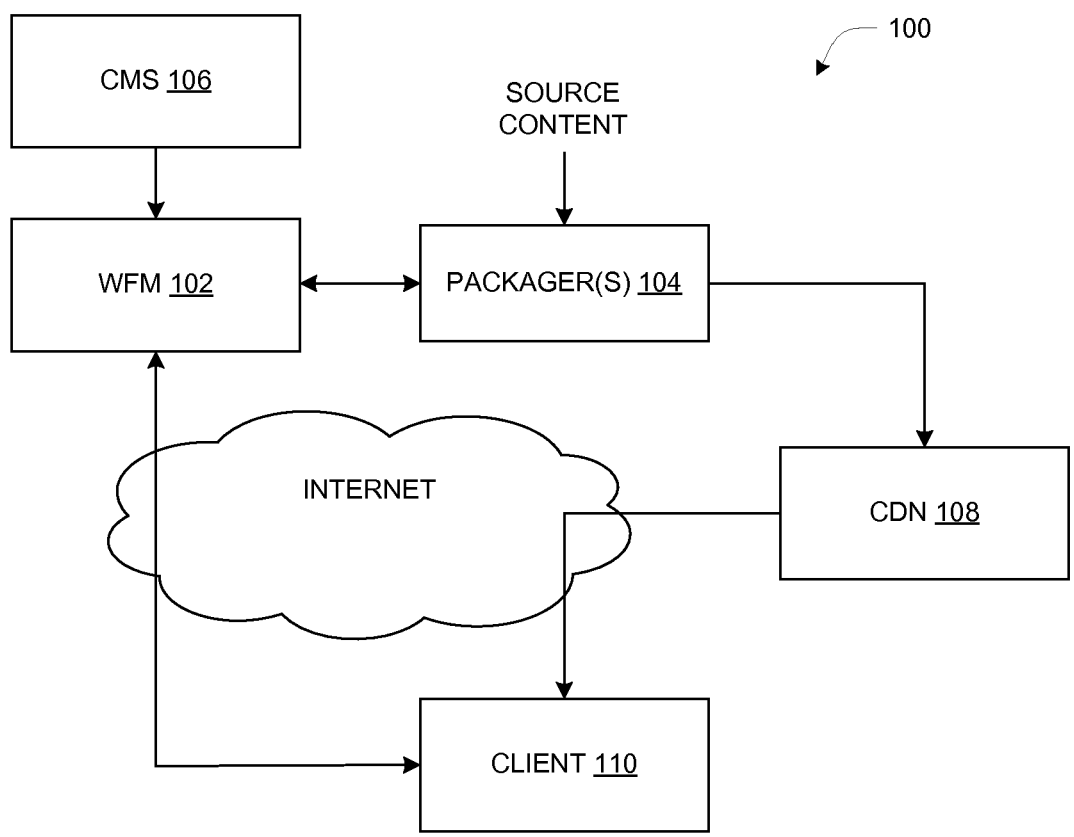
FIG. 1 is a block diagram of a system which is capable of conducting trick play procedures, in accordance with various embodiments of the invention.

In FIG. 1 is a block diagram of a system 100 for one embodiment of the present invention. As shown, it includes a workflow manager (WFM) 102, one or more packaging servers or "packager(s)" 104, a content management system (CMS) 106, a content delivery network (CDN) 108, and client devices or "clients" 110. Generally in operation, the packager(s) 104 receive source content and process or "package" the source content so that it may be delivered to the clients 110 via the CDN 108. Specifically, the packager(s) 104 perform transcoding and content encryption using a series of content encryption keys as described below. The CMS 112 provides high-level control over content ingestion, packaging and delivery, while the WFM 102 performs more detailed control operations.

The workflow manger (WFM) 102 is responsible for acquiring source content information from the content management system (CMS) 106 and instructing one or more packagers 104 to prepare the content for distribution. In one embodiment, preparation includes transcoding audio and video into a plurality of encodings using different codecs, bitrates, frame rates, sample rates, and resolutions. The transcoded content is then written into a plurality of output files. In one embodiment, a plurality of output files contain the same transcoded content encapsulated in different container formats (e.g., 3GP, MP4, MPEG-TS, WMV, MOV, etc.). In one embodiment, the prepared output files are segmented into fixed duration segment files (e.g., MPEG-TS segments, fragmented MP4 segments, 3GP DASH segments, etc.). In one embodiment, the output files, both segmented and un-segmented, are encrypted using standard encryption protocols (e.g., AES-128, HC-128, RC4, etc.). In one embodiment, all preparation steps are performed by a single content packaging server 104, referred to herein as a packager.

In another embodiment, individual preparation steps (e.g., transcoding, segmentation, encryption, etc.) may be performed across different physical content packaging servers 104. In one embodiment the WFM 102 and packager 104 reside in the same physical server. In another embodiment, the WFM 102 and packager 104 reside in different physical servers in the same data center. In another embodiment, the WFM 102 and packager 104 reside in different physical servers in remote data centers.

It will be appreciated that the term "server" used herein refers to a general-purpose or special-purpose computer, generally including memory, input/output circuitry, and instruction processing logic along with interconnections such as one or more high-speed data buses connecting those components together. Many aspects of the disclosed techniques can be embodied as software executing on one or more server computers. Similarly, a "client" herein is a computerized device (also including the above components) capable of receiving content from a network connection and decoding and rending the content on a display or similar output device. So-called smartphones are specifically included within the definition of client as used herein.

In one embodiment, the packager 104 produces segments with fixed sized GOPs. In another embodiment, the packager 104 produces segments with variable sized GOPs. In one embodiment, all segments produced by the packager 104 begin with a key frame. In another embodiment, segments produced by the packager 104 may begin with non-key frames. In one embodiment, the packager 104 generates custom trick play segments. In one embodiment, the trick play segments contain only key frames. In a normal playback segment, key frames occur only once per GOP. In one embodiment, the key frames in the trick play segments conform to the same GOP structure as the normal segments, i.e., the trick play segment contains the exact same key frames as a normal playback segment, it just does not contain any non-key frames. In another embodiment, the key frames conform to a fixed GOP small enough to support the shortest trick play granularity. If the trick play GOP is smaller than the normal playback GOP a separate encoding will be required to generate additional key frames, and those key frames will be of lower quality as the increased key frame rate will negatively impact compression. In one embodiment, separate trick play segments are generated for forward and reverse directions, wherein the reverse direction trick play segments have frames in the opposite order of the forward direction trick play segments. Once the segments are complete, the packager 104 uploads the segments to the content delivery network (CDN) 108.

The client 110 issues a playback request to the WFM 102. The WFM 102 responds with information about the content, including content location in the CDN 108, content encodings (e.g., different bitrates, different formats, etc.), and trick play format availability. The client 110 begins retrieving segments from the CDN 108 for normal playback. When the user requests trick play, the client 110 modifies its segment retrieval. In one embodiment, the client 110 retrieves normal playback segments from the CDN 108, but requests a lower encoded bitrate (B/R), where B is the estimated bandwidth available and R is the trick play playout rate multiplier. In another embodiment, the client 110 retrieves custom trick play segments from the CDN 108. In another embodiment, the client 110 retrieves only the initial portion of normal playback segments from the CDN 108. In one embodiment, this limited retrieval can be done using an HTTP range GET request. In another embodiment, the limited retrieval can be done by aborting a non-range HTTP GET request prior to completion. Techniques for aborting download of a stream are generally known in the art.

Figure 2:
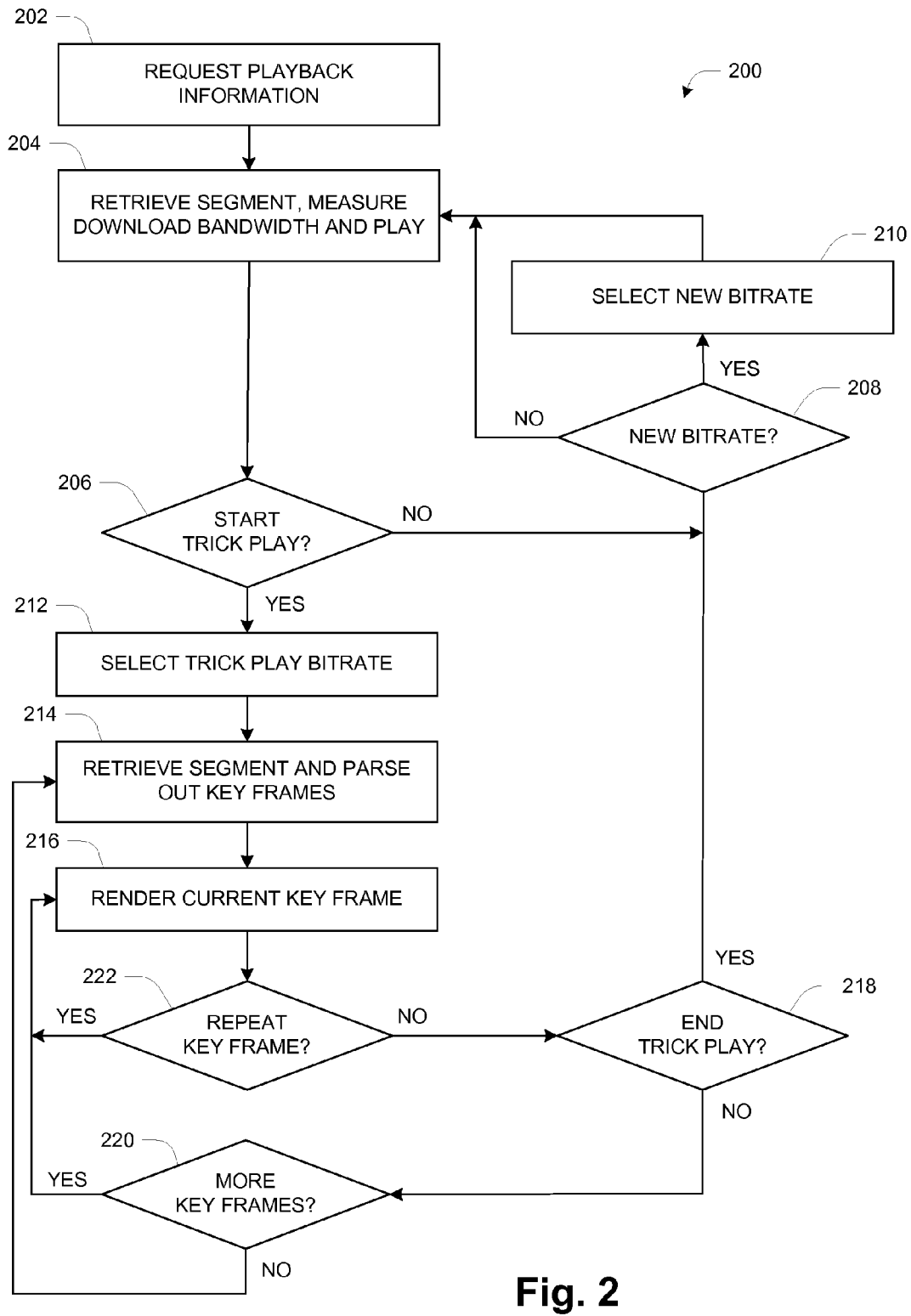
FIG. 2 is a flow chart showing a method for performing trick play, in accordance with an embodiment of the present invention.

In FIG. 2 is a flow chart describing a process 200 performed at a client 110 for implementing trick play using existing normal playout segments. In step 202 the client 110 issues a playback request to the WFM 102. The WFM 102 responds to the client 110 with information about the content requested, including: content location in the CDN 108, available content encodings, content rights and encryption information, etc. Once the client 110 has the CDN 108 location information, it begins downloading and normal playback of segments in step 204. Also at this point, the client 110 monitors download rates to estimate available bandwidth.

In step 206, the client 110 checks to see if trick play has been requested. If no trick play is requested, processing moves to step 208 where the client 110 checks the current bandwidth estimate and determines if rate adaptation is required. If no rate adaptation is required, processing proceeds back to step 204 where the next segment is downloaded and played back. If a rate switch is deemed necessary at step 208, processing proceeds to step 210 where a new bitrate is selected, based on the current bandwidth estimates, before proceeding back to step 204 for download and playback of the next segment. Though checking for a trick play request has been inserted as a discrete ordered step 206, it should be appreciated by those skilled in the art that such requests are typically generated asynchronously through human intervention. The detection of a trick play request (e.g., pressing the rewind or fast forward button) may occur at any time and should be understood that these conditions may interrupt step 204 at any time. Similarly, the download and playback of segments may be asynchronous in that segments may be prefetched in order to protect against network interruption. The processing of segments in step 204 should be understood to support playback of previously downloaded segments in parallel to the downloading of segments for use in future playback.

If a trick play request is detected in step 206, processing proceeds to step 212 where the client 110 selects a new content encoding bitrate for use during trick play (referred to as the "trick play bitrate"). In one embodiment, the trick play uses normal playback segments, playing out selected frames faster than normal and discarding non-key frame data. In one embodiment, the client 110 compensates for the increased data rate required to support faster than normal playout, by selecting content encoded at a bitrate less than (B/R), where B is the estimated bandwidth available and R is the trick play playout rate multiplier. Once the trick play bitrate is selected, processing proceeds to step 214 where the next segment is downloaded such that it adheres to the selected trick play bitrate. The segment is parsed to extract the key frames and processing proceeds to step 216. As with download and playout in step 204, download and parsing in step 214 should also be understood to support parsing of previously downloaded segments in parallel to the downloading of segments for use in future playback.

In step 216, the client 110 renders the current key frame and proceeds to step 222, where the client 110 checks to see if a given key frame should be repeated. Because key frames are only generated on GOP boundaries, playing each key frame once would give a fixed trick play playout rate multiplier of G, where G is the GOP size. Trick play may require finer granularity than the GOP provides, i.e., access to trick play playout rate multipliers other than G. In one embodiment, each key frame is repeated (G/R) times, where G is the GOP size and R is the trick play playout rate multiplier. For a given GOP, playing each key frame once would give a fixed trick play playout rate multiplier of G, where G is the GOP size. A smaller GOP reduces the number of times a key frame must be repeated thus providing a finer granularity of detail in the rendered trick play playback. A larger GOP requires that key frames be repeated more thus providing a coarser granularity of detail in the rendered trick play playback. If the key frame is determined in step 222 to require repeating, processing proceeds back to step 216 where the frame is rendered again. This looping from 216 to 222 is repeated G/R times. If the key frame is determined in step 222 not to require repeating, processing proceeds to step 218 where a check is performed to see if trick play is to end (e.g., by a user pressing a "play" button to revert to normal playback).

If at step 218 trick play has ended, processing proceeds back to step 208. If trick play has not ended, processing proceeds to step 220 where a check is performed to see if more key frames from the current segment are available. Because a segment may contain more than one key frame, before proceeding back to step 214 to retrieve and parse a new segment, all key frames within the segment currently being parsed should be used. In one embodiment, if the frame repetition count (G/R) is less than 1, intermediate key frames may need to be discarded in order to meet the desired trick play playback rate. In step 220, the client 110 selects the next appropriate frame to render which may not be the next sequential frame. If more key frames are available in step 220, processing proceeds back to step 216 where the next key frame is rendered. If no more key frames are available, processing proceeds back to step 214 where the next segment is downloaded and parsed. As with the trick play start check in step 206, checking for trick play end in step 218 has been inserted as a discrete ordered step, but it should be appreciated by those skilled in the art that such requests are typically generated asynchronously through human intervention. The detection of trick play end (e.g., pressing the "play" button) may occur at any time, and it should be understood that these conditions may interrupt steps 214, 222, 216, and 220 at any time.

Figure 3:
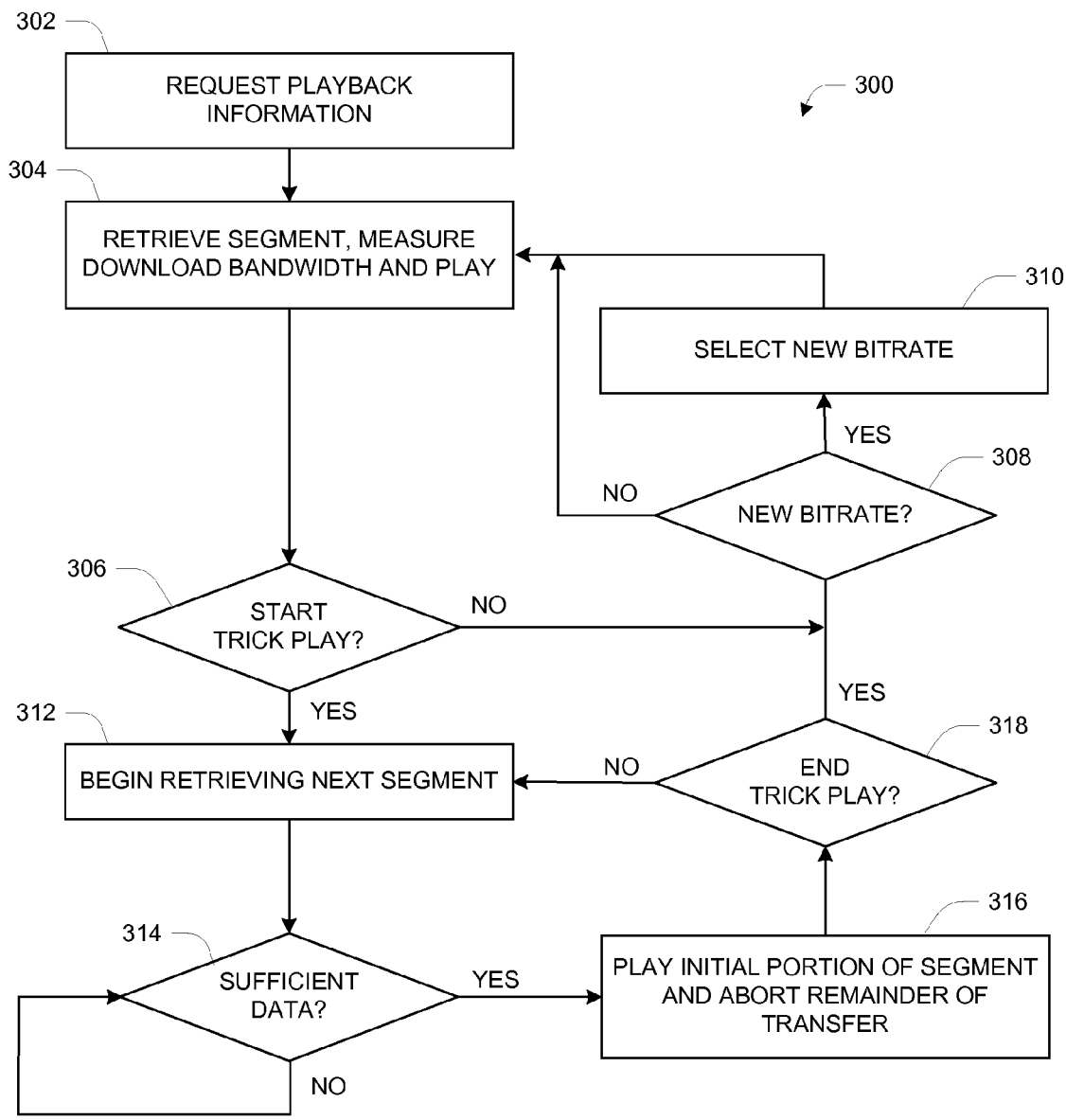
FIG. 3 is a flow chart showing another method for performing trick play, in accordance with an embodiment of the present invention.

In FIG. 3 is a flow chart 300 describing a process performed at a client 110 for implementing trick play using the initial portions of existing normal playout segments. Steps 302-310 are identical to steps 202-210 of process 200. In step 302 the client 110 issues a playback request to the WFM 102. The WFM 102 responds to the client 110 with information about the content requested, including: content location in the CDN 108, available content encodings, content rights and encryption information, etc. Once the client 110 has the CDN 108 location information, it begins downloading and normal playback of segments in step 304. The client 110 monitors download rates in step 304 to estimate available bandwidth. In step 306, the client 110 checks to see if trick play has been requested. If no trick play is required, processing moves to step 308 where the client 110 checks the current bandwidth estimate and determines if rate adaptation is required. If no rate adaptation is required, processing proceeds back to step 304 where the next segment is downloaded and played back. If a rate switch is deemed necessary at step 308, processing proceeds to step 310 where a new bitrate is selected, based on the current bandwidth estimates, before proceeding back to step 304 for download and playback of the next segment. Though checking for a trick play request has been inserted as a discrete ordered step 306, it should be appreciated by those skilled in the art that such requests are typically generated asynchronously through human intervention. The detection of a trick play request (e.g., pressing the rewind or fast forward button) may occur at any time and should be understood that these conditions may interrupt step 304 at any time. Similarly, the download and playback of segments may be asynchronous in that segments may be prefetched in order to protect against network interruption. The processing of segments in step 304 should be understood to support playback of previously downloaded segments in parallel to the downloading of segments for future playback.

If a trick play request is detected in step 306, processing proceeds to step 312 where the client 110 begins retrieving the next segment. In one embodiment, the segment retrieved is encoded at the same bitrate as the normal playout segments. In another embodiment, the segment retrieved is encoded at a bitrate less than or equal to (B−O/D), where B is the estimated bandwidth available, O is the overhead of aborting a segment download connection measured is unnecessary bits downloaded, and D is the fixed time duration of each segment. Overhead may be incurred due to latency in the detection of the completion of the download of the desired data or due to the round trip latency required to signal the abort of the download connection as described in steps 314 and 316 below. Once segment retrieval has begun, processing proceeds to step 314 where the client 110 checks to see if enough data has been downloaded. Because only the initial portion of the segment is used for trick play, once sufficient data has been retrieved the remaining download may be aborted. If insufficient data has been downloaded, the connection may not be aborted and processing proceeds back to step 314 to continue checking If sufficient data has been downloaded the retrieval connection is aborted and processing proceeds to step 316 where the initial portion is played out. As with download and playout in step 304, download and playout in steps 312, 314, and 316 should also be understood to support playout of previously downloaded segments in parallel to the downloading of segments for use in future playback. Once the playout of the initial portion of the downloaded segment is complete, processing proceeds to step 318 where a check is performed to see if a request has been made to end trick play. If at step 318 trick play has ended, processing proceeds back to step 308. If trick play has not ended, processing proceeds back to step 312 where a retrieval of the next segment begins. As with the trick play start check in step 306, checking for trick play end in step 318 has been inserted as a discrete ordered step, but it should be appreciated by those skilled in the art that such requests are typically generated asynchronously through human intervention. The detection of trick play end (e.g., pressing the "play" button) may occur at any time and should be understood that these conditions may interrupt steps 312, 314, and 316 at any time.

Figure 4:
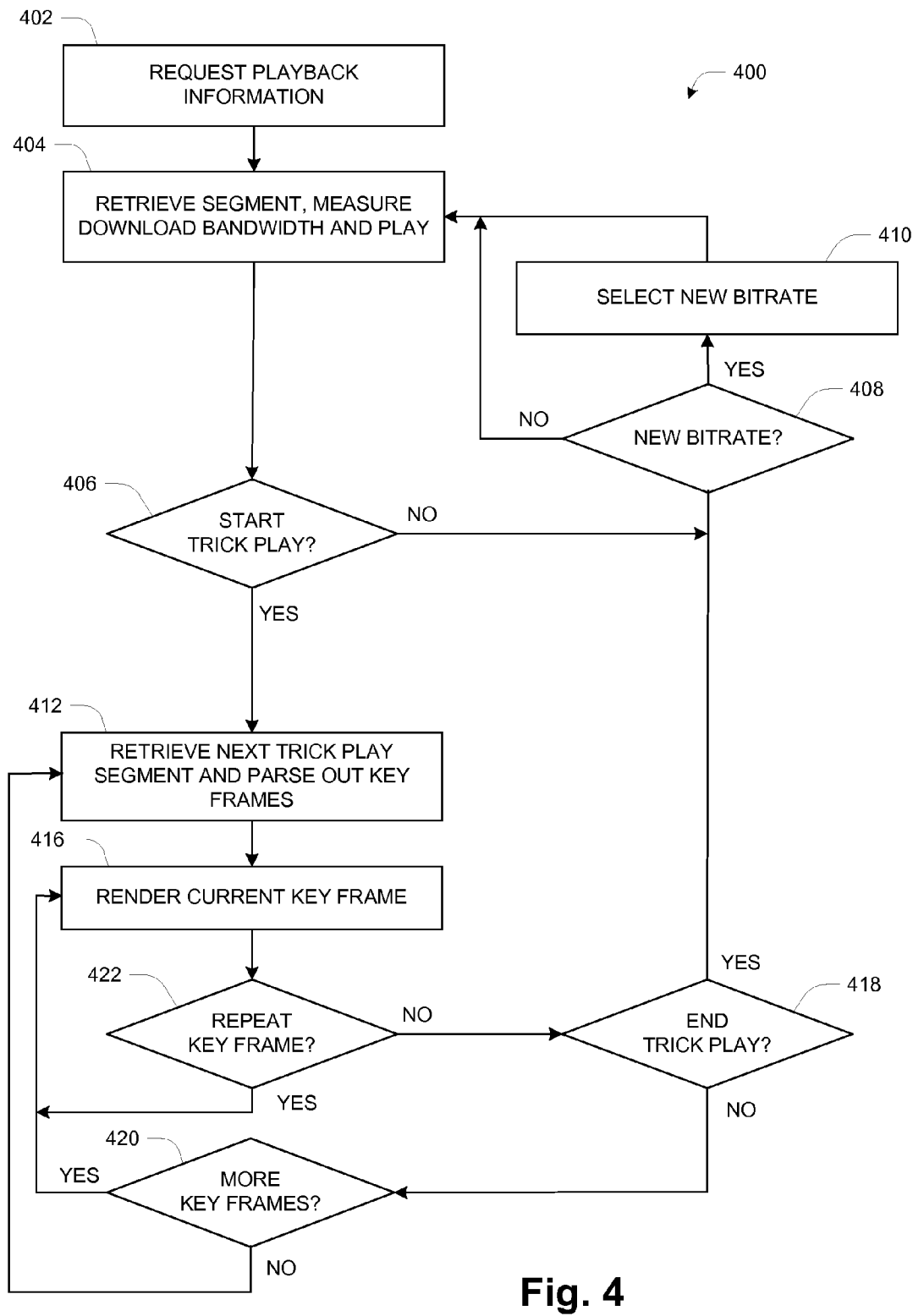
FIG. 4 is a flow chart showing yet another method for performing trick play, in accordance with an embodiment of the present invention.

In FIG. 4 is a flow chart 400 describing a process performed at a client 110 for implementing trick play using custom trick play segments. Steps 402-410 are identical to steps 202-210 of process 200. In step 402 the client 110 issues a playback request to the WFM 102. The WFM 102 responds to the client 110 with information about the content requested, including: content location in the CDN 108, available content encodings, content rights and encryption information, etc. Once the client 110 has the CDN 108 location information, it begins downloading and normal playback of segments in step 404. The client 110 monitors download rates in step 404 to estimate available bandwidth. In step 406, the client 110 checks to see if trick play has been requested. If no trick play is required, processing moves to step 408 where the client 110 checks the current bandwidth estimate and determines if rate adaptation is required. If no rate adaptation is required, processing proceeds back to step 404 where the next segment is downloaded and played back. If a rate switch is deemed necessary at step 408, processing proceeds to step 410 where a new bitrate is selected, based on the current bandwidth estimates, before proceeding back to step 404 for download and playback of the next segment. Though checking for a trick play request has been inserted as a discrete ordered step 406, it should be appreciated by those skilled in the art that such requests are typically generated asynchronously through human intervention. The detection of a trick play request (e.g., pressing the rewind or fast forward button) may occur at any time and should be understood that these conditions may interrupt step 404 at any time. Similarly, the download and playback of segments may be asynchronous in that segments may be prefetched in order to protect against network interruption. The processing of segments in step 404 should be understood to support playback of previously downloaded segments in parallel to the downloading of segments for future playback.

If a trick play request is detected in step 406, processing proceeds to step 412 where the client 110 retrieves the next trick play segment and parses out the key frames. In one embodiment, the packager 104 generates custom trick play segments containing only key frames in the desired order for use in trick play. The custom trick play segment simplifies the parsing of key frames at the client 110. In one embodiment, metadata is provided for each key frame describing its intended presentation time for normal playout. As with download and playout in step 404, download and parsing in step 412 should also be understood to support parsing of previously downloaded segments in parallel to the downloading of segments for use in future playback. Steps 416-422 are similar to steps 216-222 of process 200. In step 416, the client 110 renders the current key frame and proceeds to step 422, where the client 110 checks to see if a given key frame should be repeated. In one embodiment, the key frames in the trick play segments conform to the same fixed sized GOP as the normal playback segments. In another embodiment, the key frames in the trick play segments may conform to a smaller GOP than the normal playback segments, in order to provide finer granularity in trick play playout rate selection. In another embodiment, the key frames in the trick play segment may conform to a larger GOP than the normal playback segments, in order to further reduce the bandwidth required for trick play segments. In one embodiment, each key frame is repeated (G/R) times, where G is the GOP size and R is the trick play playout rate multiplier. For a given GOP, playing each key frame once would give a fixed trick play playout rate multiplier of G, where G is the GOP size. A smaller GOP reduces the number of times a key frame must be repeated thus providing a finer granularity of detail in the rendered trick play playback. A larger GOP requires that key frames be repeated more thus providing a coarser granularity of detain in the rendered trick play playback. If the key frame is determined in step 422 to require repeating, processing proceeds back to step 416 where the frame is rendered again (the looping from 216 to 222 will be repeated G/R times). If the key frame is determined in step 422 not to require repeating, processing proceeds to step 418 where a check is performed to see if a request has been made to end trick play. If at step 418 trick play has ended, processing proceeds back to step 408. If trick play has not ended, processing proceeds to step 420 where a check is performed to see if more key frames from the current segment are available. Because a segment may contain more than one key frame, before proceeding back to step 412 to retrieve and parse a new segment, all key frames within the previously parsed segment should be used. In one embodiment, if the frame repetition count (G/R) is less than 1, intermediate key frames may need to be discarded in order to meet the desired trick play playback rate. In step 420, the client 110 selects the next appropriate frame to render which may not be the next sequential frame. If more key frames are available in step 420, processing proceeds back to step 416 where the next key frame is rendered. If no more key frames are available, processing proceeds back to step 412 where the next segment is downloaded and parsed. As with the trick play start check in step 406, checking for trick play end in step 418 has been inserted as a discrete ordered step, but it should be appreciated by those skilled in the art that such requests are typically generated asynchronously through human intervention. The detection of trick play end (e.g., pressing the "play" button) may occur at any time and should be understood that these conditions may interrupt steps 412, 422, 416, and 420 at any time.

Although the above description includes numerous specifics in the interest of a fully enabling teaching, it will be appreciated that the present invention can be realized in a variety of other manners and encompasses all implementations falling within the scope of the claims herein.

While various embodiments of the invention have been particularly shown and described, it will be understood by those skilled in the art that various changes in form and details may be made therein without departing from the spirit and scope of the invention as defined by the appended claims.

What is claimed is:

1. A method for performing a trick play action in a streaming video session, the trick play action achieving a trick play rendering of content at a trick play playback rate different from a normal playback rate, comprising:

retrieving content at a normal download bandwidth and in a normal format usable for normal playback rendering at the normal playback rate;

receiving a trick play request from a user; and in response to the trick play request, performing a trick play rendering by making only selected use of frames of the retrieved content for the normal playback rendering while also performing a compensating action to maintain the normal download bandwidth notwithstanding a playback rate difference between the trick play playback rate and the normal playback rate, wherein the compensating action includes retrieving a version of the content encoded at a trick play bitrate different from a normal playback bitrate encoding used for the normal playback rendering, and the version of the content encoded at the trick play bitrate is retrieved at a trick play retrieval rate different from a normal playback retrieval rate by a factor inversely related to a ratio of the trick play playback rate to the normal playback rate corresponding to the normal download bandwidth.

2. The method of claim 1, wherein retrieving content includes sending content requests to network storage devices and receiving corresponding responses using a hypertext transfer (HTTP) protocol.

3. The method of claim 2, further comprising issuing HTTP range requests to retrieve selected segments from a large file containing the content.

4. The method of claim 2, further comprising retrieving individual segment files for pre-segmented content.

5. The method of claim 1, further including calculating a bandwidth estimate based on measurements performed when downloading the content.

6. The method of claim 1, wherein the trick play playback rate is specified in the trick play request as a trick play rate modifier.

7. The method of claim 6, wherein the trick play retrieval rate is calculated as a product of a normal playback retrieval rate and the trick play rate modifier.

8. The method of claim 6, wherein the trick play bitrate is calculated as a current bandwidth estimate divided by the trick play rate modifier.

9. The method of claim 8, further comprising: resuming normal playback upon ending of the trick play action, the normal playback including retrieving content encoded at the normal playback bitrate using the normal playback retrieval rate.

10. The method of claim 1, wherein the selected use includes use of only independently renderable frames from normal playback content.

11. The method of claim 10, further comprising: repeated rendering of individual ones of the independently renderable frames to achieve the trick play playback rate.

12. The method of claim 11, further comprising: using seek operations to navigate the normal playback content to find the independently renderable frames.

13. The method of claim 1, wherein the selected use includes use of only an initial portion of normal playback content segments.

14. The method of claim 13, wherein only the initial portion of the normal playback content is retrieved using hypertext transfer protocol range GET requests to obtain only the initial portion from a large file.

15. The method of claim 13, wherein the use of only the initial portion is effected by prematurely aborting a connection over which the normal playback content is being retrieved.

16. The method of claim 1, wherein the selected use includes use of only a subset of normal playback content segments.

17. A computerized device operable according to claim 1, comprising:

memory storing computer program instructions;
computer instruction processing circuitry;
input/output circuitry operative to couple the computerized device to external devices; and
interconnection circuitry connecting the memory, computer instruction processing circuitry and input or output circuitry together,
wherein the computer program instructions are executable by the computer instruction processing circuitry to cause the computerized device to perform the method of claim 1.

18. The method of claim 1, wherein the selected use includes use of only an initial portion of retrieved content segments for the version of the content encoded at the trick play bitrate different from the normal-bitrate encoding used for the normal playback rendering.

19. The method of claim 1, wherein making only selected use of frames is performed in an initial period of trick play rendering using previously retrieved normal playback content occupying a cache of normal playback content, and further including, upon exhaustion of the cache of normal playback content, retrieving trick play content for use in a remaining period of the trick play rendering.

* * * * *

UNITED STATES PATENT AND TRADEMARK OFFICE
CERTIFICATE OF CORRECTION

PATENT NO.         : 8,925,021 B2                                              Page 1 of 1
APPLICATION NO.    : 13/540788
DATED              : December 30, 2014
INVENTOR(S)        : Ma et al.

It is certified that error appears in the above-identified patent and that said Letters Patent is hereby corrected as shown below:

In the specification

In Column 8, Line 60, delete "checking" and insert -- checking. --, therefor.

In the claims

In Column 11, Line 33, in Claim 7, delete "of a" and insert -- of the --, therefor.

In Column 12, Line 24, in Claim 17, delete "input/output" and insert -- input or output --, therefor.

Signed and Sealed this
Fourteenth Day of June, 2016

Michelle K. Lee
*Director of the United States Patent and Trademark Office*